July 22, 1924.

W. L. SMITH

TRACTION DEVICE

Filed Dec. 4, 1923

1,502,407

Inventor
WAYNE L. SMITH
his Attorneys

Patented July 22, 1924.

1,502,407

UNITED STATES PATENT OFFICE.

WAYNE L. SMITH, OF COLUMBUS, OHIO.

TRACTION DEVICE.

Application filed December 4, 1923. Serial No. 678,376.

*To all whom it may concern:*

Be it known that I, WAYNE L. SMITH, a citizen of the United States, residing at Columbus, in the county of Franklin and State of Ohio, have invented a certain new and useful Improvement in Traction Devices, of which the following is a specification.

As traction engines are very heavy it is necessary that their wheels be equipped with traction lugs to enable them to travel over soft or clayey ground but traction lugs are very destructive of roads hence some States I believe have laws prohibiting their use on the public highways. The object of the present invention is to provide an improved lug equipment of simple and economical form that can be easily and quickly applied to or removed from the wheels.

The invention is embodied in the example herein shown and described the features of novelty being finally claimed.

In the accompanying drawing—

Figure 1:
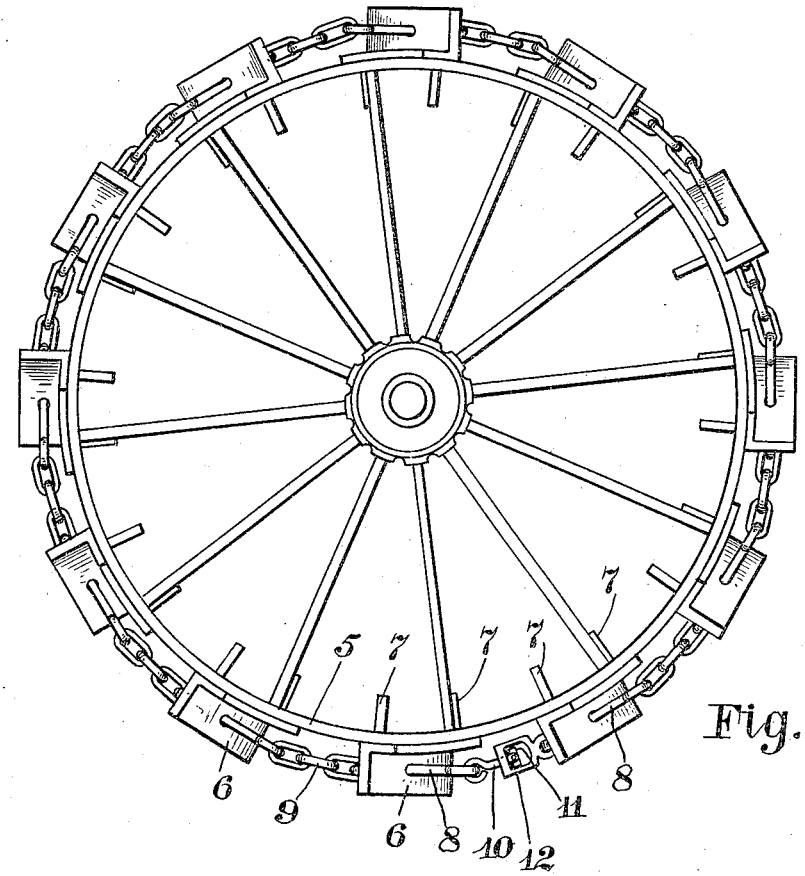
Figure 1 is a view in side elevation of a wheel equipped with my invention.
Figure 2:
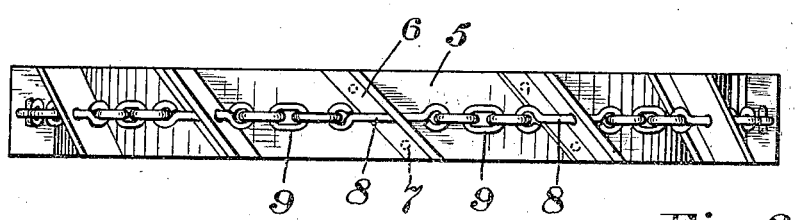
Fig. 2 is a plan view of the same.

In the views 5 designates the rim of the wheel which as used on traction engines are quite broad. 6 designates cleats or lugs preferably of angle bar and each provided on one of its webs with a pair of pins 7. The rim is provided with perforations through which these pins can be freely passed so that the cleats shall stand at an inclination of about forty-five degrees to the planes of the sides of the wheel. Each of the cleats is provided in the other of its webs with a perforation in which is slidingly secured a bolt 8 having an eye at each of its ends, and the adjacent eyes of said bolts are connected by one or more chain links 9 except at the ends of the series at which are any suitable means for coupling them as for example a tongue 10 having a pivoted cross latch 11 adapted to engage a loop 12 into the opening of which the cross latch is first passed by alining the latch with the tongue as usual in such structures.

The union of the sliding links or bolts 8 and ordinary chain links 9 makes a chain of special form permitting the creation or ample slack between the cleats when the latter with their long pins 7 are to be placed on and removed from the rim of the wheel. The advantage of the sliding bolts 8 is not lessened even if it be necessary to remove one or more of the common links for the purpose of taking up slack due to elongation of the device incident to its use.

Figure 3:
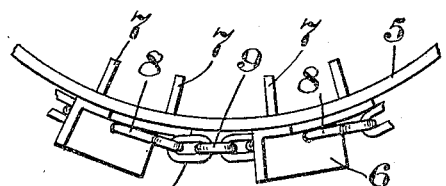
Fig. 3 is a view of a small fraction of the wheel showing a slight modification showing how the chain is located nearer the rim.

In Fig. 3 is illustrated how the chain can be located nearer the rim of the wheel than when as shown in Fig. 1. This is accomplished merely by making the holes for the reception of the sliding links nearer the web of the cleat that lies upon the wheel rim.

The forms of the parts can be changed without departing from the gist of the invention as claimed.

What I claim is:

1. A traction device for the wheel of a tractor, comprising, in combination, a series of cleats and a chain upon which said cleats are strung composed of elongated eyebolts slidingly engaged with the cleats, and links connecting the eyebolts.

2. A traction device for the wheel of a tractor, comprising, in combination, a series of cleats each having a pin for engaging the wheel rim and a chain upon which said cleats are strung composed of elongated eyebolts slidingly engaged with the cleats, and links connecting the eyebolts.

3. A traction device for the wheel of a tractor, comprising, in combination, a series of cleats of angle bar with means on one of their webs for engaging them with the rim of the wheel and a chain upon which said cleats at their other webs are strung, said chain composed of elongated eyebolts slidingly engaged with the cleats, and links connecting the eyebolts.

4. A traction device for the wheel of a tractor, comprising, in combination, a series of cleats and a chain upon which said cleats are strung composed of elongated eyebolts slidingly engaged with the cleats and links connecting the eyebolts, and means for uniting the ends of said chain when the cleats are applied to the wheel rim.

WAYNE L. SMITH.